(12) United States Patent
Hisamatsu et al.

(10) Patent No.: US 9,941,823 B2
(45) Date of Patent: Apr. 10, 2018

(54) MOTOR CONTROL DEVICE

(71) Applicant: KABUSHIKI KAISHA YASKAWA DENKI, Kitakyushu-shi (JP)

(72) Inventors: Junya Hisamatsu, Kitakyushu (JP); Taishi Hiromi, Kitakyushu (JP); Yusuke Tanaka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/138,222

(22) Filed: Apr. 26, 2016

(65) Prior Publication Data

US 2016/0241174 A1 Aug. 18, 2016

Related U.S. Application Data

(63) Continuation of application No. PCT/JP2013/079434, filed on Oct. 30, 2013.

(51) Int. Cl.

| G05B 11/28 | (2006.01) |
|---|---|
| H02P 6/12 | (2006.01) |
| H02P 27/08 | (2006.01) |
| H02M 1/08 | (2006.01) |
| H02P 6/28 | (2016.01) |

(Continued)

(52) U.S. Cl.
CPC ............. *H02P 6/12* (2013.01); *H02H 7/1225* (2013.01); *H02M 1/08* (2013.01); *H02M 1/082* (2013.01); *H02M 1/38* (2013.01); *H02P 6/28* (2016.02); *H02P 27/08* (2013.01); *H02M 1/32* (2013.01)

(58) Field of Classification Search
USPC .......... 318/400.21, 400.22, 400.26, 563, 782
See application file for complete search history.

(56) References Cited

U.S. PATENT DOCUMENTS

| 2006/0056212 A1 | 3/2006 | Schierling |
| 2012/0036408 A1 | 2/2012 | Rahman et al. |

(Continued)

FOREIGN PATENT DOCUMENTS

| EP | 2651023 | 10/2013 |
| JP | 61-56983 | 3/1986 |

(Continued)

OTHER PUBLICATIONS

International Search Report for corresponding International Application No. PCT/JP2013/079434, dated Feb. 4, 2014.

(Continued)

*Primary Examiner* — Jorge L Carrasquillo
(74) *Attorney, Agent, or Firm* — Mori & Ward, LLP (57) ABSTRACT

This disclosure discloses a motor control device configured to control a motor. The motor control device includes an inverter part, a gate driving circuit, a PWM generation circuit, at least one gate buffer, and a control part. The inverter part is configured to convert direct current into alternate current in response to a motor drive command. The gate driving circuit is configured to drive the inverter part. The PWM generation circuit is configured to generate a PWM signal applied to the gate driving circuit. The at least one gate buffer is disposed between the gate driving circuit and the PWM generation circuit. The control part is configured to apply a test signal to the gate buffer to determine abnormality of the gate buffer.

15 Claims, 8 Drawing Sheets

(51) Int. Cl.
*H02M 1/38* (2007.01)
*H02H 7/122* (2006.01)
*H02M 1/32* (2007.01)

(56) References Cited

U.S. PATENT DOCUMENTS

2013/0278191 A1* 10/2013 Zushi .................... H02H 7/122
 318/400.22
2014/0092655 A1* 4/2014 Igarashi ................. B60L 3/003
 363/56.03

FOREIGN PATENT DOCUMENTS

| JP | 61056983 A * | 3/1986 |
| JP | 07-181227 | 7/1995 |
| JP | 2010-104187 | 5/2010 |
| JP | 2010104187 A * | 5/2010 |
| JP | 2013-223363 | 10/2013 |

OTHER PUBLICATIONS

Written Opinion for corresponding International Application No. PCT/JP2013/079434, dated Feb. 4, 2014.
International Preliminary Report on Patentability with Translation of Written Opinion of the International Searching Authority for corresponding International Application No. PCT/JP2013/079434, dated May 12, 2016.
Japanese Office Action for corresponding JP Application No. 2015-544698, dated Oct. 26, 2016.
Extended European Search Report for corresponding EP Application No. 13896412.7-1809, dated Apr. 13, 2017.

* cited by examiner

| STOP INPUT SIGNAL | | SWITCH CONTROL SIGNAL | | STOP SIGNAL ABNORMALITY DETERMINATION |
|---|---|---|---|---|
| HWBB1 | HWBB2 | BBON1 | BBON2 | |
| ON | ON | "L" | "L" | NORMAL |
| ON | OFF | "L" | "H" | ABNORMAL |
| OFF | ON | "H" | "L" | ABNORMAL |
| OFF | OFF | "H" | "H" | NORMAL |

[FIG. 5]

| SWITCH CONTROL SIGNAL | | PULSE INPUT SIGNAL | | GATE BUFFER FUNCTIONAL ABNORMALITY DETERMINATION |
|---|---|---|---|---|
| BBON1 | BBON2 | DPIN1 | DPIN2 | |
| "L" | --- | PULSE | --- | NORMAL |
| "H" | --- | "H" or "L" | --- | ABNORMAL |
| --- | --- | "H" | --- | NORMAL |
| --- | "L" | --- | PULSE | NORMAL |
| --- | "H" | --- | "H" or "L" | ABNORMAL |
| --- | --- | --- | "H" | NORMAL |

MOTOR CONTROL DEVICE

CROSS-REFERENCE TO RELATED APPLICATION

This is a continuation application of PCT/JP2013/079434, filed Oct. 30, 2013, which was published under PCT article 21(2).

TECHNICAL FIELD

The disclosed embodiment relates to a motor control device.

BACKGROUND

A technique for connecting a three-state buffer for switching between conduction and blocking of a PWM signal to between a PWM generation circuit and a gate driving circuit, and detecting an abnormal state of a safe stop circuit itself by logical product of a signal outputting an abnormal state of the three-state buffer is known.

SUMMARY

According to one aspect of the disclosure, there is provided a motor control device configured to control a motor. The motor control device includes an inverter part, a gate driving circuit, a PWM generation circuit, at least one gate buffer, and a control part. The inverter part is configured to convert direct current into alternate current in response to a motor drive command. The gate driving circuit is configured to drive the inverter part. The PWM generation circuit is configured to generate a PWM signal applied to the gate driving circuit. The at least one gate buffer is disposed between the gate driving circuit and the PWM generation circuit. The control part is configured to apply a test signal to the gate buffer to determine abnormality of the gate buffer.

DESCRIPTION OF THE EMBODIMENTS

Figure 1:
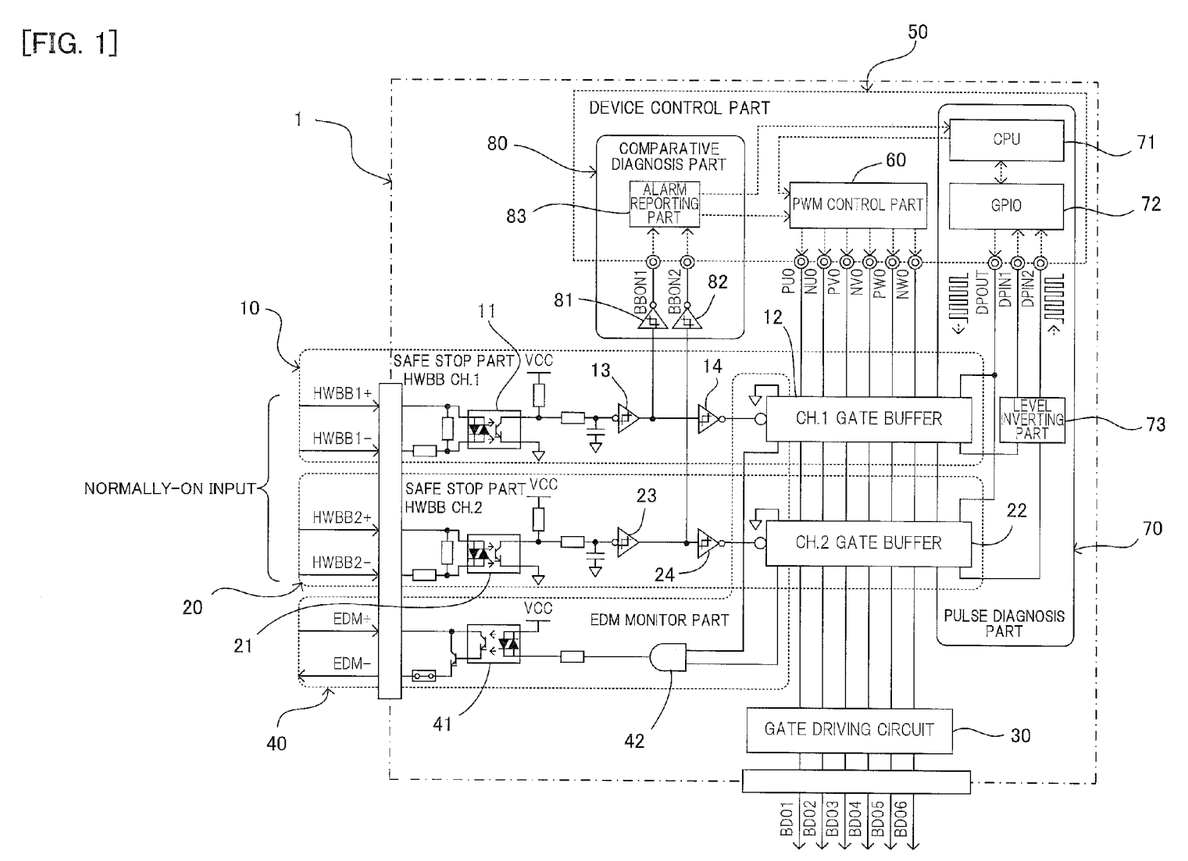
FIG. 1 illustrates a functional block of a motor control device according to an embodiment.

With reference to drawings, an embodiment will be described below. FIG. 1 illustrates a functional block of a motor control device according to a present embodiment. A motor control device 1 of the present embodiment includes two safe stop parts 10, 20, a gate driving circuit 30, an inverter part (not illustrated), an EDM monitor part 40, and a device control part 50.

The two safe stop parts 10, 20 mainly include photo couplers 11, 21, gate buffers 12, 22, and two NOT gates 13, 14, 23, 24, respectively. The photo couplers 11, 21 each include input terminals (one set of two input terminals at a left side in FIG. 1) and output terminals (one set of two output terminals at a right side in FIG. 1), and output from the output terminals a switch control signal corresponding to a state content of stop input signals HWBB1, HWBB2 input from an outside of the motor control device 1 to the input terminals via internal optical signal transmission. In other words, while electric insulation is secured between an input terminal side and an output terminal side, an input state of the stop input signals HWBB1, HWBB2 input to the input terminals is transmitted to the output terminals. The gate buffers 12, 22 each include a plurality of three-state buffers in parallel therein (not particularly illustrated), for example, and switch states between conduction and blocking (referred to as "conduction state", below) between input and output of all three-state buffers to the same state with the switch control signal (function of gate buffers 12, 22 will be described in detail below with reference to FIG. 2). The NOT gates 13, 14 and the NOT gates 23, 24 are connected in series to the switch control signals output from the output terminals of the photo couplers 11, 21, respectively, and each have a Schmitt trigger configuration (hysteresis characteristics) for chattering prevention.

The switch control signals output from the first NOT gates 13, 23 viewed from the photo couplers 11, 21 are input to a comparative diagnosis part 80 (described below) of the device control part 50, and the switch control signals output from the second NOT gates 14, 24 are input to the switch control input terminals of the gate buffers 12, 22, respectively. In an example illustrated in FIG. 1, when the photo couplers 11, 21 are turned on by the stop input signals HWBB1, HWBB2, an L level is input to the first NOT gates 13, 23 (the NOT gates 13, 23 output an H level), and the H level is input to the second NOT gates 14, 24 (the NOT gates 14, 24 output the L level). Further, the two gate buffers 12, 22 are connected in series to each of six PWM signals output from the PWM control part described below. In other words, for each PWM signal, a safe stop part 10 for channel 1 (CH.1) and a safe stop part 20 for channel 2 (CH.2) are doubly provided.

The gate driving circuit 30 receives the PWM signals via the two gate buffers 12, 22, and outputs a motor drive command to an inverter part (not particularly illustrated) disposed outside the motor control device 1 based on the PWM signals. The inverter part switches between conduction and blocking of an internal switch element in response to the motor drive command to thereby convert direct current into alternate current, and feeds a drive power to a motor (not particularly illustrated). In FIG. 1, the inverter part is not illustrated.

The inverter part includes, for example, IGBT or an IGBT module. When the inverter part includes the IGBT module, the inverter part may include the gate driving circuit 30.

The EDM monitor part 40 mainly includes a photo coupler 41 and an AND gate 42. As described below, the two gate buffers 12, 22 include functional state signal output terminals, respectively. Functional state signals output from the functional state signal output terminals are input to the AND gate 42. The AND gate 42 (an example of logical product circuit) obtains logical product of the two functional state signals, and inputs an output of the logical product to an input terminal of the photo coupler 41. In the example of FIG. 1, when an output of the AND gate 42 is at the L level, the photo coupler 41 is turned on. The photo coupler 41, while securing the electric insulation between the input terminal side and the output terminal side, transmits to the output terminal an input state of the signal input to the input terminal, and outputs it outside the motor control device 1.

The device control part 50 (an example of control part, an example of means for discriminating abnormality of the gate buffer) mainly includes a PWM control part 60, a pulse diagnosis part 70, and a comparative diagnosis part 80. The PWM control part 60 (an example of PWM generation circuit) generates and outputs the PWM signal for driving and controlling a motor based on a command from a host controller (not particularly illustrated) disposed outside the motor control device 1, for example. In the example illustrated in FIG. 1, corresponding to a case in which the motor to be controlled is a three-phase AC motor (including a rotational type and a linear type), two PWM signals for each phase, totally six PWM signals PU0, NU0, PV0, NV0, PW0, NW0 are output.

The pulse diagnosis part 70 (an example of diagnosis part) includes a CPU 71, a GPIO 72, and a level inverting part 73. The CPU 71 inputs a same test signal DPOUT to a diagnosis signal input terminal included in each of the two gate buffers 12, 22 via the GPIO 72. The test signal DPOUT dynamically changes and is output as a pulse waveform signal that periodically changes, in the example of the present embodiment. The two gate buffers 12, 22 include diagnosis signal output terminals outputting diagnosis signals DPIN1, DPIN2 (an example of signal outputs from the gate buffers) based on the test signal DPOUT input to diagnosis signal input terminals, respectively. The level inverting part 73 (an example of inverter circuit) inverts levels of diagnosis signals DPIN1, DPIN2 output from the respective diagnosis signal output terminals, and inputs them to the CPU 71 via the GPIO 72.

The comparative diagnosis part 80 (an example of switch control signal branch input part) includes two NOT gates 81, 82, and an alarm reporting part 83. The levels of the switch control signals output from the first NOT gates 13, 23 of the two safe stop parts 10, 20 respectively are inverted at the two NOT gates 81, 82 of the comparative diagnosis part 80, and the switch control signals are input to the alarm reporting part 83. A state content of two switch control signals BBON1, BBON2 to be input to the alarm reporting part 83 is the same as a state content of the switch control signal to be input to the gate buffers 12, 22 respectively. The two NOT gates 81, 82 included in the comparative diagnosis part 80 also have the Schmitt trigger configuration (hysteresis characteristics).

In the example of the present embodiment, the alarm reporting part 83 includes two functions. The first function is a function of discriminating whether a trouble has occurred in at least one of the photo couplers 11, 21 and a stop operation part (not particularly illustrated) outside for inputting stop input signals HWBB1, HWBB2 to safe stop parts 10, 20 respectively based on the two signals (switch control signals BBON1, BBON2) input to the alarm reporting part 83 (refer to FIGS. 3 and 4 described below). The second function is a function of transmitting and inputting the output signals of the two NOT gates 81, 82 to the CPU 71 without change so that the pulse diagnosis part 70 can determine occurrence of abnormality in the two gate buffers 12, 22.

Figure 2:
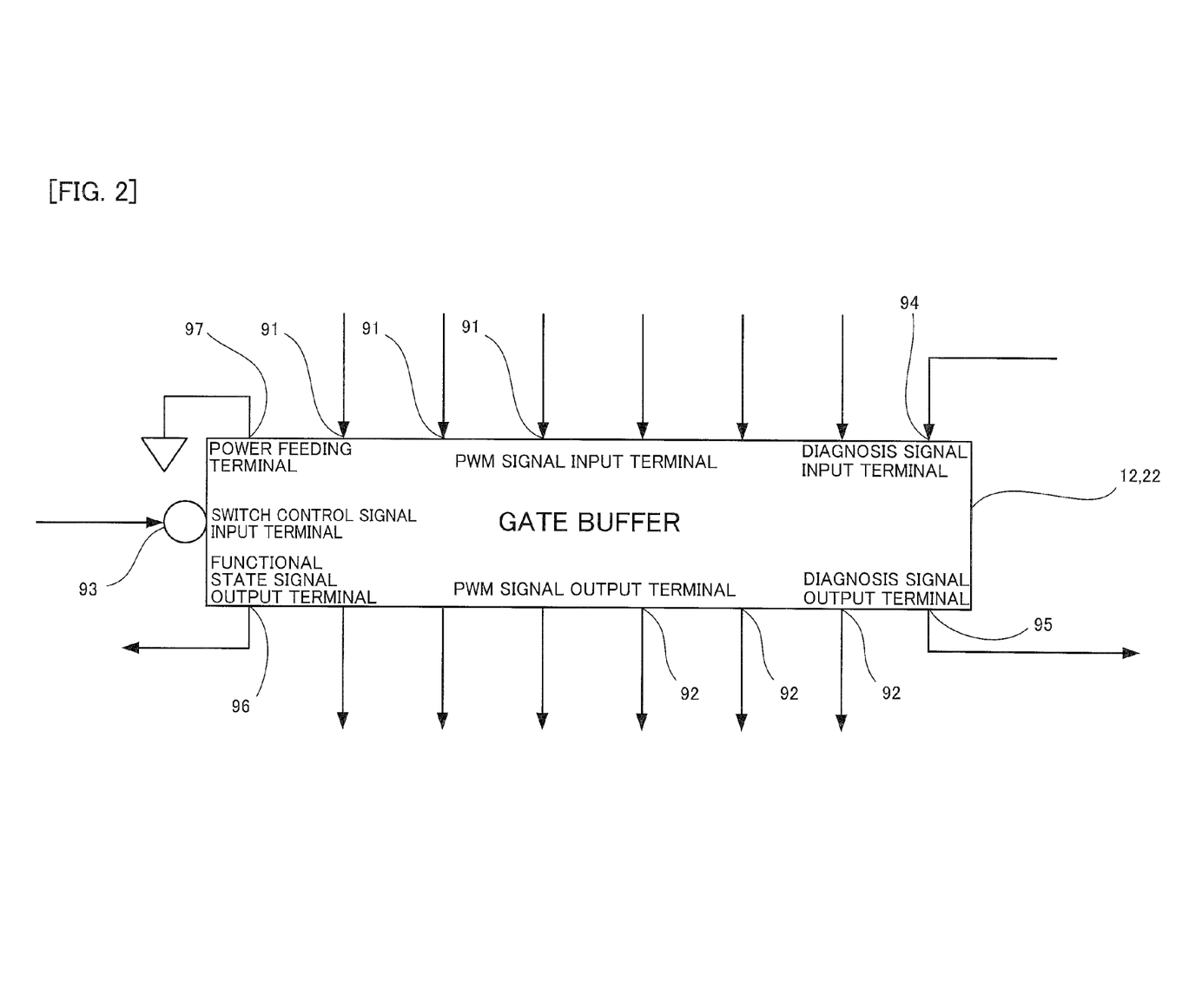
FIG. 2 illustrates an enlarged gate buffer.

With reference to FIG. 2 in which one of the gate buffers 12, 22 is enlarged, functions of the gate buffers 12, 22 will be described in detail. In the FIG. 2, the gate buffers 12, 22 each include six PWM signal input terminals 91 (an example of PWM signal input part), six PWM signal output terminals 92 (an example of PWM signal output part), a switch control signal input terminal 93 (an example of switch signal input part), a diagnosis signal input terminal 94 (an example of diagnosis signal input part), a diagnosis signal output terminal 95 (an example of diagnosis signal output part), a functional state signal output terminal 96 (an example of functional state signal output part), and a power feeding terminal 97. Further, the gate buffers 12, 22 each include six three-state buffers corresponding to respective PWM signals inside in parallel (not particularly illustrated). As a main function of such gate buffers 12, 22, on the basis of the switch control signals BBON1, BBON2 to be input to the switch control signal input terminal 93, the conduction states of the respective three-state buffers are switched to switch all conduction states between the PWM signal input terminals 91 and the PWM signal output terminals 92 that correspond to each other to the same states. When the switch control signals BBON1, BBON2 are at the L level, the connection between the PWM signal input terminals 91 and the PWM signal output terminals 92 is conducted (i.e., a state where, at the normal state, the photo couplers 11, 21 of normally-on input are turned on and the photo coupler output becomes the L level). On the other hand, when the switch control signals BBON1, BBON2 are at the H level, the connection between the PWM signal input terminals 91 and the PWM signal output terminals 92 is blocked (in other words, a state where, at the normal state, the photo couplers 11, 21 of the normally-on input are turned off and the photo coupler output becomes the H level). In this case, the PWM signal output terminals 92 become a high impedance state (so-called an active-low configuration).

In addition, an auxiliary function of the gate buffers 12, 22 includes outputting the diagnosis signals DPIN1, DPIN2 and the functional state signal. The conduction state between the diagnosis signal input terminal 94 and the diagnosis signal output terminal 95 is adapted to be the same as that between the PWM signal input terminals 91 and the PWM signal output terminals 92, at the normal state. However, when abnormality occurs due to, for example, a trouble of the three-state buffer inside, whatever level of the test signal DPOUT may be input to the diagnosis signal input terminal 94, only the diagnosis signals DPIN1, DPIN2 for constantly maintaining the H level or the L level are output from the diagnosis signal output terminal 95.

Further, the gate buffers 12, 22 output the switch control signals BBON1, BBON2 and the functional state signal corresponding to the conduction state between the PWM signal input terminals 91 and the PWM signal output terminals 92 from the functional state signal output terminal 96. In the example, on the basis of the switch control signals BBON1, BBON2 and the conduction state between the PWM signal input terminals 91 and the PWM signal output terminals 92, when the gate buffers 12, 22 determine the occurrence of the abnormality internally, the functional state signal is output at the H level.

The motor control device 1 having the configuration described above has a double STO (Safe Torque Off) function for switching between conduction and blocking of the PWM signals of the two gate buffers 12, 22 by inputting the two stop input signals HWBB1, HWBB2 to easily and reliably switch between power feeding drive and its stop of the motor. In the example, outside the device, a single stop operation part (not particularly illustrated) including a press button switch, for example, is provided in a normally-on configuration for inputting both the two stop input signals HWBB1, HWBB2 at the H level during a usual operation (i.e., a state where, at the normal state, the photo couplers 11, 21 for normally-on input are turned on and the photo coupler output becomes the L level). During the usual operation when the stop operation part is not operated, the two stop input signals HWBB1, HWBB2 are input at the H level, and the switch control signals BBON1, BBON2 at the L level are input to the gate buffers 12, 22 and the alarm reporting part 83, respectively. With this arrangement, the PWM signals are conducted in the gate buffers 12, 22, and the power feeding drive to the motor is continued. On the other hand, an operator operates the stop operation part, both the two stop input signals HWBB1, HWBB2 are input at the L level, and the switch control signals BBON1, BBON2 are input at the H level to the gate buffers 12, 22 and the alarm reporting part 83, respectively. With this arrangement, the PWM signals are blocked in the gate buffers 12, 22 to stop the power feeding drive to the motor (referred to as "HWBB state" below).

However, as described above, functional abnormality in the gate buffers 12, 22 may occur in which the conduction state between the PWM signal input terminals 91 and the PWM signal output terminals 92 is forcibly blocked due to a trouble of the gate buffers 12, 22 or, at any input level to the PWM signal input terminals 91, the output level from the PWM signal output terminals 92 is maintained to be at the H level or the L level. Further, the safe stop parts 10, 20 may erroneously operate due to a trouble of at least any one of the stop operation part and the photo couplers 11, 21. In a case where the power feeding drive of the motor is unintentionally stopped and an HWBB state is set, it cannot be determined whether, viewed from the host controller or the PWM control part 60, the case is caused by normal operations of the safe stop parts 10, 20, or by the abnormality of the gate buffers 12, 22 or a trouble of at least any one of the stop operation part and the photo couplers 11, 21. Even so, the occurrence of the abnormality of the gate buffers 12, 22 can be detected from an output of the EDM monitor part 40. However, if the switch control signals BBON1, BBON2 are not input to the gate buffers 12, 22, the abnormality cannot be defected from the functional state signal that is detection reference. Therefore, the motor control device 1 according to the present embodiment specifies a cause of the HWBB state by the comparative diagnosis part 80 and the pulse diagnosis part 70 in addition to the EDM monitor part 40.

Figure 3:
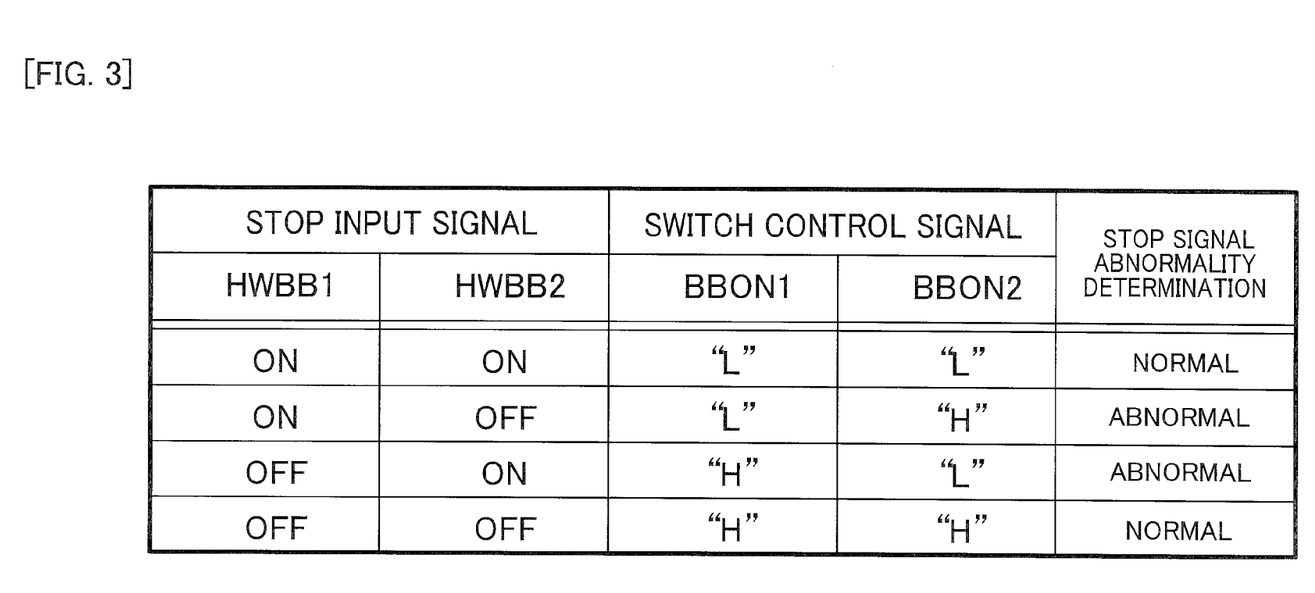
FIG. 3 is a signal reference table for discriminating a trouble of a stop operation part.

First, as described above, the single stop operation part in the example is configured to input the both stop input signals HWBB1, HWBB2 at the same level. Therefore, the comparative diagnosis part 80 can determine the occurrence of the trouble in at least any one of the stop operation part and the photo couplers 11, 21 depending on combination of contents of the two input switch control signals BBON1, BBON2. For example, as illustrated in FIG. 3, when both the two switch control signals BBON1, BBON2 are at the L level or the H level, since the two stop input signals HWBB1, HWBB2 are in an on state or an off state, it can be determined that all of the stop operation part and the photo couplers 11, 21 operate normally. On the other hand, when the two switch control signals BBON1, BBON2 are different in the L level and H level from each other, the two stop input signals HWBB1, HWBB2 have different contents. Therefore, it can be determined that a trouble has occurred in at least any one of the stop operation part and the photo couplers 11, 21.

Figure 4:
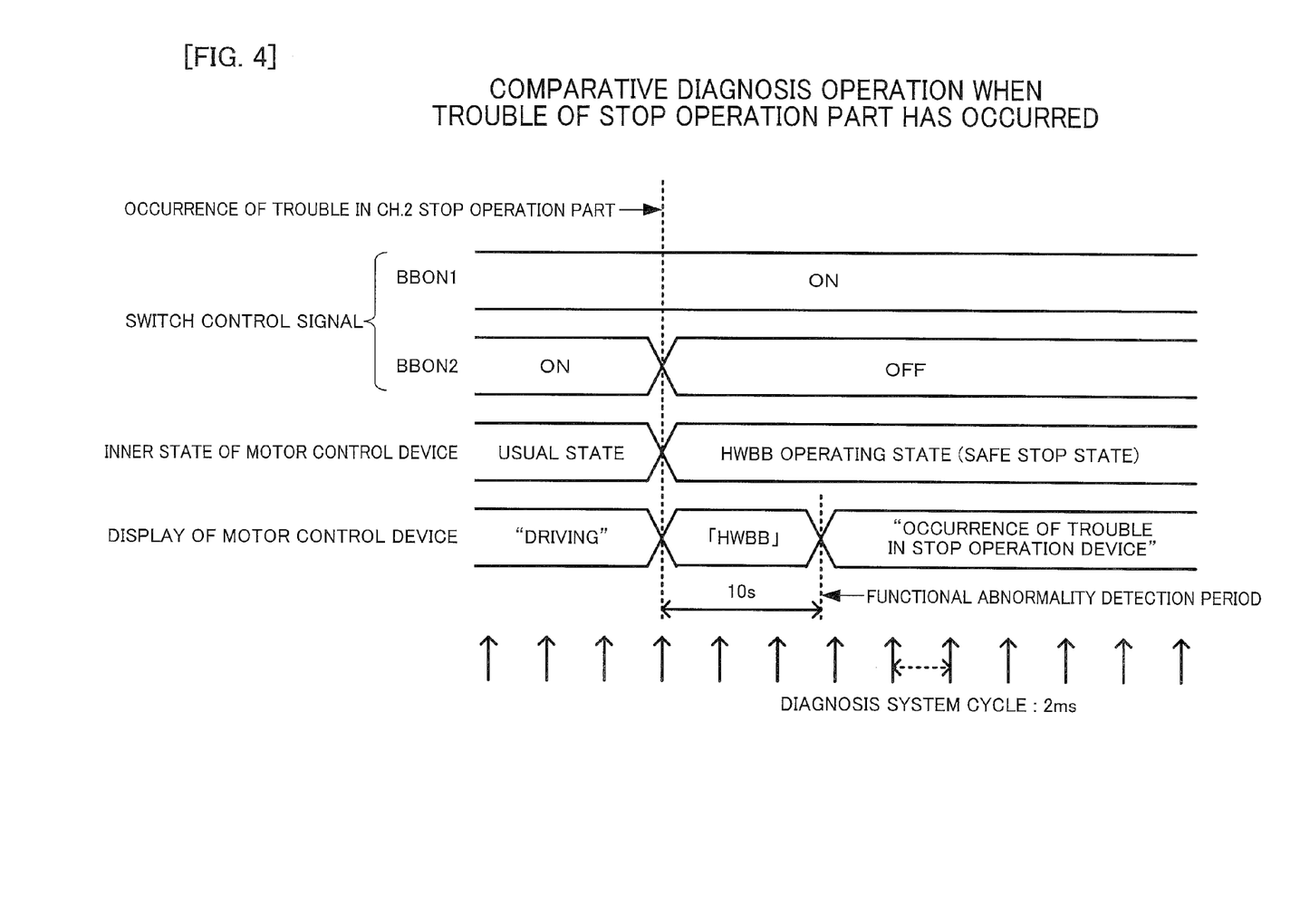
FIG. 4 is a time chart for comparative diagnosis operations when a trouble occurs in the stop operation part.

FIG. 4 is a time chart of comparative diagnosis operations when a trouble occurs in the stop operation part. In the example illustrated in FIG. 4, the comparative diagnosis part 80 performs diagnosis at a system cycle of 2 ms. When either one of the two switch control signals BBON1, BBON2 becomes the off state (the H level in this example, the photo couplers 11, 21 are in the off state, and CH.2 in the example in FIG. 4), the corresponding gate buffers 12, 22 are blocked to become the HWBB state, and further "HWBB operating" is displayed on a display, (not particularly illustrated), for example. Subsequently, when still other switch control signals BBON1, BBON2 do not become the same off state even when a moratorium in consideration of time difference in the stop operation part (10 s in the example illustrated in FIG. 4, displayed with a system cycle width ignored in FIG. 4) has elapsed, the comparative diagnosis part 80 determines which trouble of at least one of the stop operation part and the photo couplers 11, 21 has occurred and displays "stop operation device trouble has occurred" on the display with the HWBB state kept. At this point, the alarm reporting part 83 stops operations of the PWM control part 60.

Figure 5:
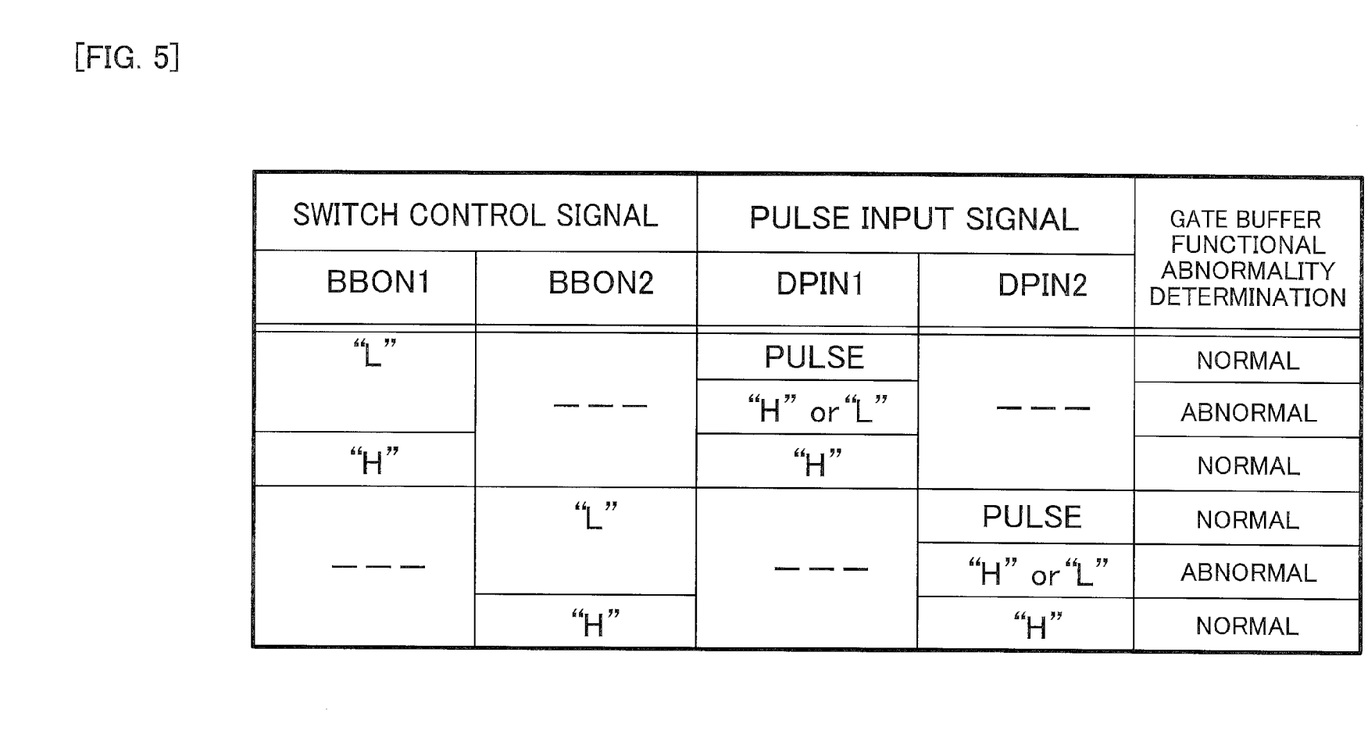
FIG. 5 is a signal reference table for discriminating abnormality of the gate buffer.

Further, the pulse diagnosis part 70 can determine the occurrence of the abnormality in the gate buffers 12, 22 based on the two switch control signals BBON1, BBON2 input from the comparative diagnosis part 80 and the two diagnosis signals DPIN1, DPIN2 input from the level inverting part 73. For example, as illustrated in FIG. 5, when the switch control signals BBON1, BBON2 corresponding to the gate buffers 12, 22 of one channel are at the L level, it is assumed that the corresponding gate buffers 12, 22 are conducted. Thus, if the diagnosis signals DPIN1, DPIN2 corresponding to the same gate buffers 12, 22 still have the same pulse waveform as that of the test signal DPOUT, it can be determined that the gate buffers 12, 22 operate normally. On the other hand, even if the switch control signals BBON1, BBON2 are at the L level, when the corresponding diagnosis signals DPIN1, DPIN2 constantly maintain the H level or L level, it can be determined that the abnormality of the corresponding gate buffers 12, 22 has occurred. Further, if the switch control signals BBON1, BBON2 are at the H level, it is assumed that the corresponding gate buffers 12, 22 are blocked. Thus, the diagnosis signals DPIN1, DPIN2 corresponding to the same gate buffers 12, 22 constantly maintain the H level by the level inverting part 73 (gate buffers 12, 22 are blocked) (determined as operating normally). This applies the same also to another channel. The test signal DPOUT is a periodical signal in the pulse waveform that dynamically changes, and thus can be also dynamically determined by the pulse diagnosis part 70.

Figure 6:
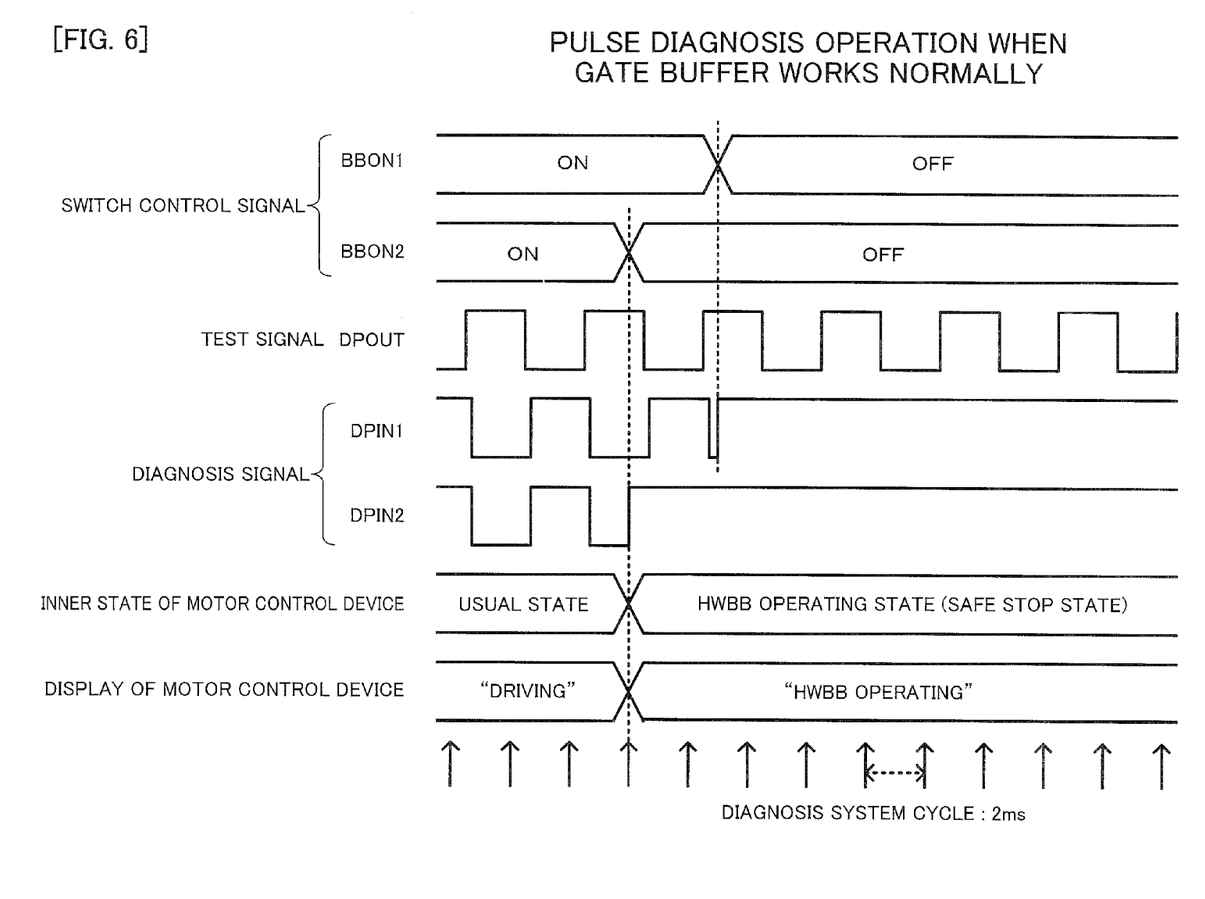
FIG. 6 is a time chart for pulse determination operations when the gate buffer works normally.

FIG. 6 is a time chart illustrating pulse diagnosis operations when the gate buffer operates normally. In FIG. 6, when the pulse diagnosis part 70 detects that either one of the two switch control signals BBON1, BBON2 has become the off state (the H level in this example, the photo couplers 11, 21 are in the off state, and CH.2 in the example illustrated in FIG. 6), the gate buffers 12, 22 synchronizing and actively corresponding to the system cycle are blocked to set the motor control device 1 in the HWBB state, and further displays the "HWBB operating" on the display or the like. In this case, since the corresponding gate buffers 12, 22 are normally blocked, the diagnosis signals DPIN1, DPIN2 constantly maintain the H level (or L level). If all of the stop operation part and the photo couplers 11, 21 operate normally, subsequently, other switch control signals BBON1, BBON2 become the off state, the corresponding gate buffers 12, 22 are also normally blocked, and the diagnosis signals DPIN1, DPIN2 constantly maintain the same level.

Figure 7:
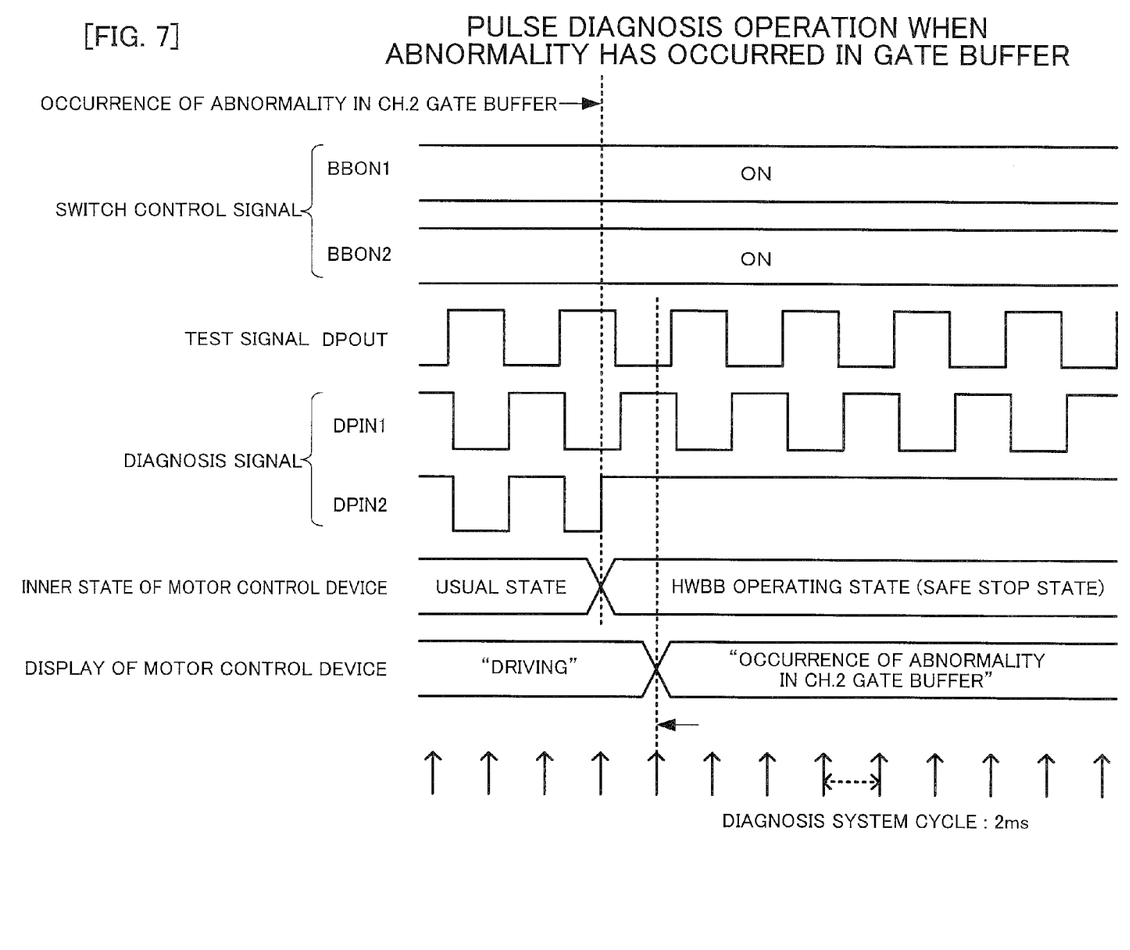
FIG. 7 is a time chart for pulse determination operations when abnormality occurs in the gate buffer.

On the other hand, FIG. 7 illustrates a time chart of the pulse diagnosis operations when the abnormality of the gate buffer occurs. In FIG. 7, even if both the two switch control signals BBON1, BBON2 maintain the on state (the L level in this example, the photo couplers 11, 21 are in the on state), for example, the abnormality may occur in the CH.2 gate buffer 22 and the diagnosis signal DPIN2 may constantly maintain the H level (or L level). In this case, the switch control signals BBON1, BBON2 do not change but only the diagnosis signal DPIN2 changes to constantly maintain the level. At this point, the corresponding gate buffer 22 is blocked to set the motor control device 1 in the HWBB state. However, the pulse diagnosis part 70 reacts the diagnosis signal DPIN2 to constantly maintain, and then detects and compares the switch control signal BBON2 that instantly corresponds. Since the diagnosis signal DPIN2 constantly maintains the level even though the corresponding switch control signal BBON2 maintains the on state (the L level in this example, the photo couplers 11, 21 are in the on state), the pulse diagnosis part 70 determines that the abnormality has occurred in the corresponding gate buffer 22. Therefore, a name (CH.2 gate buffer) of the gate buffer 22 corresponding to the display and "abnormality occurred" are displayed in a subsequent system cycle. Further, at this point, the CPU 71 stops the PWM control part 60 from acting due to the occurrence of the abnormality in one gate buffer 22.

Setting of normally-on and normally-off of the stop operation part, the number of the NOT gates 13, 14, 23, 24 and their arrangement may be appropriately changed according to specification of the gate buffers 12, 22, and correspondence of the signals illustrated in FIGS. 3 and 5 may be changed accordingly.

According to the first embodiment described above, following effects can be obtained. In other words, the motor control device 1 according to the present embodiment includes the device control part 50 configured to determine the abnormality of the gate buffers 12, 22 by applying the test signal DPOUT to the gate buffers 12, 22, and thus the motor control device 1 can determine the abnormality in the gate buffers 12, 22 and further specify the gate buffer determined to be abnormal. Further, with this arrangement, the device control part 50 can determine the occurrence of the abnormality in the gate buffers 12, 22 also in a case where an operator operates the stop operation part as a test, both when the motor is driven and stopped.

Further, according to the present embodiment, particularly, the device control part 50 includes the comparative diagnosis part 80 configured to branch and input the switch control signals BBON1, BBON2 for conducting or blocking the PWM signal to the gate buffers 12, 22, and the pulse diagnosis part 70 configured to output the test signal DPOUT changing dynamically to the gate buffers 12, 22 and determine the abnormality of the gate buffers 12, 22 based on the state of the switch control signals BBON1, BBON2 and the state of the diagnosis signals DPIN1, DPIN2 from the gate buffers 12, 22. With this arrangement, the pulse diagnosis part 70 compares the state of the switch control signals BBON1, BBON2 and the diagnosis signals DPIN1, DPIN2 in the gate buffers 12, 22 so that the device control part 50 can dynamically determine the occurrence of the abnormality in the gate buffers 12, 22, and further can perform instant and reliable discrimination.

Further, according to the present embodiment, particularly, the gate buffers 12, 22 include the PWM signal input terminal 91 for inputting the PWM signal, the PWM signal output terminals 92 for outputting the PWM signals input to the PWM signal input terminals 91 without change, the switch control signal input terminal 93 for inputting the switch control signals BBON1, BBON2 for switching the connection between conducting and blocking between the PWM signal input terminals 91 and the PWM signal output terminals 92, the diagnosis signal input terminal 94 and the diagnosis signal output terminal 95 making the same state as the conduction or blocking state between the PWM signal input terminals 91 and the PWM signal output terminals 92 based on the switch control signals BBON1, BBON2. Further, when the switch control signals BBON1, BBON2 are input from the comparative diagnosis part 80, the pulse diagnosis part 70 inputs the test signal DPOUT to the diagnosis signal input terminal 94, and determines the abnormality in the gate buffers 12, 22 based on the state of the switch control signals BBON1, BBON2 and the state of the diagnosis signals DPIN1, DPIN2.

With this arrangement, if the diagnosis signals DPIN1, DPIN2 do not dynamically change, and a constant level (H or L) is stably maintained, it can be determined whether the abnormality has occurred with the conduction state between three PWM signal input terminals 91 and the PWM signal output terminals 92 at least in the gate buffers 12, 22.

Further, according to the present embodiment, particularly, the device control part 50 can determine that the abnormality has occurred in the gate buffers 12, 22 corresponding to the switch control signals BBON1, BBON2 and the diagnosis signals DPIN1, DPIN2, when, specifically, the content of the conduction state instructed with the switch control signals BBON1, BBON2 and the content of the conduction state indicated with the diagnosis signals DPIN1, DPIN2 are different from each other in comparison of the switch control signals BBON1, BBON2 and the diagnosis signals DPIN1, DPIN2.

Further, according to the present embodiment, particularly, the plurality of gate buffers 12, 22 is included. Therefore, for example, the plurality of gate buffers 12, 22 is connected in series to configure a double failure saving mechanism and further reliably stop motor drive.

Further, according to the present embodiment, particularly, the gate buffers 12, 22 include the functional state signal output terminal 96 for outputting the corresponding switch control signals BBON1, BBON2 and the functional state signal corresponding to the state of the conduction and blocking between the PWM signal input terminals 91 and the PWM signal output terminals 92 in the gate buffers 12, 22. Furthermore, the motor control device 1 includes an AND gate 42 configured to output the logical product of the functional state signal output from the respective functional state signal output terminals 96 in the gate buffers 12, 22. With this arrangement, any of the plurality of gate buffers 12, 22 can confirm a change of the functional state only with an output of one AND gate 42. Moreover, the EDM monitor part 40 is provided to maintain a prescribed signal input format for the host controller, for example.

Further, according to the present embodiment, particularly, the pulse diagnosis part 70 outputs the test signal DPOUT as a periodical signal. Between the PWM signal input terminals 91 and the PWM signal output terminals 92 of the gate buffers 12, 22, only the conduction and the blocking are switched. Therefore, the test signal DPOUT that dynamically changes is made as the periodical signal, and a change of the conduction and the blocking can be actively reflected to the diagnosis signals DPIN1, DPIN2, thereby detecting the blocking more reliably and instantly. Similar effects can be obtained even if the test signal DPOUT is made as the periodical signal such as the sinusoidal wave, in addition to the pulse waveform.

Further, according to the present embodiment, particularly, the test signal DPOUT is the periodical signal in the pulse waveform. With this arrangement, the present embodiment is suitable to be applied to a digital circuit.

Further, according to the present embodiment, particularly, the level inverting part 73 configured to invert the content of the state of the signal is included on either one of a signal line between the device control part 50 and the diagnosis signal input terminal 94 of the gate buffers 12, 22, or a signal line between the device control part 50 and the diagnosis signal output terminal 95 of the gate buffers 12, 22. With this arrangement, on the basis of difference in a waveform between the test signal DPOUT and the diagnosis signals DPIN1, DPIN2, an occurrence of short can be detected between the signal line between the device control part 50 and the diagnosis signal input terminal 94 of the gate buffers 12, 22, and the signal line of the device control part 50 and the diagnosis signal output terminal 95 of the gate buffers 12, 22. Without the level inverting part 73, even if the short occurs between the two signal lines, since the waveforms of the signals correspond with each other, the occurrence of the short cannot be detected. However, the diagnosis signals DPIN1, DPIN2 are inverted each other, therefore, the short can be detected since the two signals cannot maintain the prescribed pulse waveform when the short occurs. When the test signal DPOUT has the pulse waveform, the logical value may be inverted, however, when the test signal DPOUT is the sinusoidal wave, positive and negative are inverted.

Figure 8:
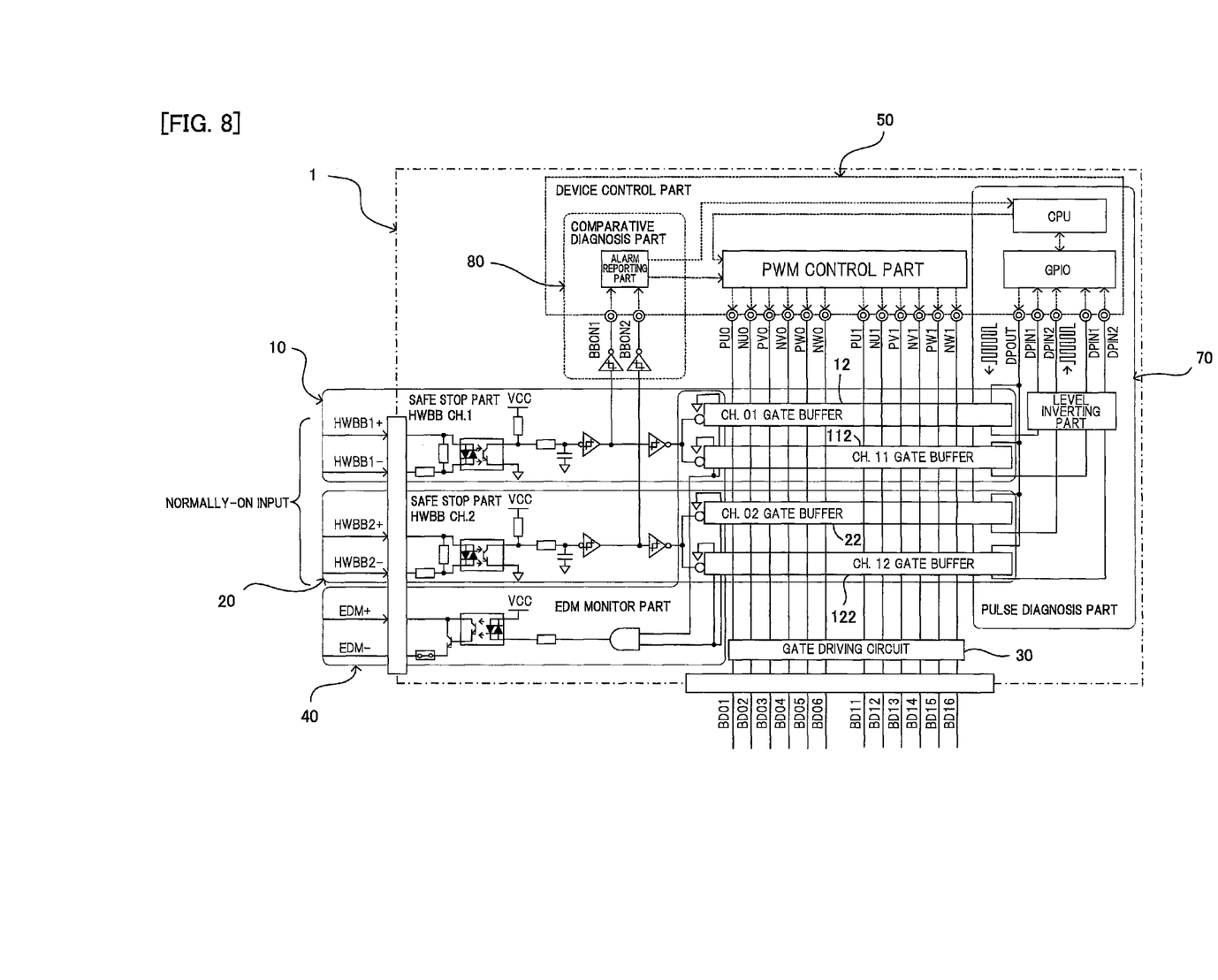
FIG. 8 illustrates a functional block of the motor control device with a configuration of two axes control and double gate buffers.

The embodiment describes the configuration in which the gate buffers 12, 22 are provided doubly under one axis control for controlling only one motor, but the present embodiment is not limited thereto. For example, when the gate buffers are provided doubly under two-axis control for controlling two motors, as illustrated in FIG. 8, the two gate buffers connected with each other in series are provided corresponding to each axis (four gate buffers 12, 22, 112, 122 in total), the two safe stop parts 10, 20, the EDM monitor part 40, and the input of the test signal DPOUT can be provided in parallel with respect to the gate buffers 12, 22, 112, 122 in each group. Further, one gate buffer may be provided corresponding to one axis (not particularly illustrated).

In addition, techniques by the embodiment and each modified example may be appropriately combined and utilized in addition to the examples having already described above.

In addition to that, although exemplification is not performed one by one, the embodiment and each modified example are carried out by various changes being applied thereto without departing from the spirit of the present disclosure.

What is claimed is:

1. A motor control device configured to control a motor, comprising:
   an inverter part configured to convert direct current into alternate current in response to a motor drive command;
   a gate driving circuit configured to drive the inverter part;
   a PWM generation circuit configured to generate a PWM signal applied to the gate driving circuit;
   at least one gate buffer disposed between the gate driving circuit and the PWM generation circuit; and
   a control part configured to apply a test signal to the gate buffer to determine abnormality of the gate buffer,
   wherein the at least one gate buffer comprises:
      a PWM signal input part configured to receive the PWM signal;
      a PWM signal output part configured to output the PWM signal received by the PWM signal input part;
      a diagnosis signal input part configured to receive the test signal;
      a diagnosis signal output part configured to output a diagnosis signal based on the test signal received by the diagnosis signal input part; and
      a switch control signal input part configured to receive a switch control signal for switching a conduction state or a blocking state of the PWM signal at the gate buffer, and
   wherein the control part comprises a diagnosis part configured to output the test signal that dynamically changes to the diagnosis signal input part of the gate buffer, configured to receive the diagnosis signal output from the diagnosis signal output part, and configured to determine that the abnormality has occurred in the gate buffer when the diagnosis signal is kept at a substantially constant level and the switch control signal is in a state corresponding to the conduction state of the PWM signal at the gate buffer.

2. The motor control device according to claim 1,
   wherein the control part comprises:
      a switch control signal branch input part configured to branch and receive the switch control signal.

3. The motor control device according to claim 2,
   wherein a state as a conduction state or a blocking state between the diagnosis signal input part and the diagnosis signal output part have a same state as between the PWM signal input part and the PWM signal output part based on the switch control signal.

4. The motor control device according to claim 3,
   wherein the at least one gate buffer comprises a plurality of gate buffers.

5. The motor control device according to claim 4,
   wherein each of the gate buffers comprises
      a functional state signal output part configured to output a functional state signal corresponding to the switch control signal and corresponding to the conduction state and the blocking state between the PWM signal input part and the PWM signal output part in the gate buffer, and
   the motor control device further comprising
      a logical product circuit configured to output logical product of the functional state signals output from the functional state signal output parts of each of the gate buffers.

6. The motor control device according to claim 5,
   wherein the control part is configured to output the test signal as a periodical signal.

7. The motor control device according to claim 6,
   wherein the periodical signal includes a pulse waveform signal.

8. The motor control device according to claim 7, further comprising
   an inverter circuit part configured to invert a waveform of a signal, the inverter circuit part disposed at either one of a signal line between the control part and the diagnosis signal input part of the gate buffer, or a signal line between the control part and the diagnosis signal output part of the gate buffer,
   wherein the diagnosis part is configured to determine that a short has occurred between the signal lines when the waveforms of the signals correspond with each other.

9. The motor control device according to claim 1, wherein the control part is configured to apply the test signal as a regularly repeating signal.

10. The motor control device according to claim 9, wherein the control part is configured to regularly repeat the test signal continuously during operation of the motor control device.

11. The motor control device according to claim 1, further comprising
an inverter circuit part configured to invert a waveform of a signal, the inverter circuit part disposed at either one of a signal line between the control part and the diagnosis signal input part of the gate buffer, or a signal line between the control part and the diagnosis signal output part of the gate buffer,
wherein the diagnosis part is configured to determine that a short has occurred between the signal lines when the waveforms of the signals correspond with each other.

12. The motor control device according to claim 1, further comprising:
a monitor part formed by a logical product circuit in communication with the at least one gate buffer,
wherein the at least one gate buffer includes a functional state signal output part configured to output a functional state signal that corresponds to the switch control signal to the monitor part, the monitor part being configured to output a logical product based on the functional state signal.

13. The motor control device according to claim 1, further comprising:
a photo coupler configured to receive a stop input signal and configured to output the switch control signal.

14. The motor control device according to claim 13, wherein the control part comprises:
a switch control signal branch input part configured to branch and receive the switch control signal, the switch control signal branch input part including an alarm reporting part configured to determine whether a malfunction has occurred in the photo coupler.

15. The motor control device according to claim 14, wherein the switch control signal is input to the alarm reporting part and to the switch control signal input part of the at least one gate buffer.

* * * * *